(12) United States Patent
Uebel et al.

(10) Patent No.: US 8,151,622 B2
(45) Date of Patent: Apr. 10, 2012

(54) SYSTEM AND METHOD FOR CALIBRATING AN AUTOMATED MATERIALS HANDLING SYSTEM

(75) Inventors: Mark Uebel, Morrisville, NC (US); James Robert Rivenbark, Jr., Raleigh, NC (US); Jonathan Daniel Brandmeyer, Morrisville, NC (US); Christopher Todd Hilliard, Bath, NC (US)

(73) Assignee: Parata Systems, LLC, Durham, NC (US)

( * ) Notice: Subject to any disclaimer, the term of this patent is extended or adjusted under 35 U.S.C. 154(b) by 0 days.

(21) Appl. No.: 13/026,643

(22) Filed: Feb. 14, 2011

(65) Prior Publication Data

US 2011/0132066 A1     Jun. 9, 2011

(51) Int. Cl.
*G01B 3/30* (2006.01)
(52) U.S. Cl. ......................................................... 73/1.79
(58) Field of Classification Search ........................ None
See application file for complete search history.

(56) References Cited

U.S. PATENT DOCUMENTS

| | | | |
|---|---|---|---|
| 2,489,841 | A | 11/1949 | Wyllie |
| 2,911,646 | A | 11/1959 | Vossen et al. |
| 4,510,693 | A | 4/1985 | Cusack |
| 4,753,569 | A | 6/1988 | Pryor |
| 4,887,016 | A | 12/1989 | Malick |
| 6,242,879 | B1 | 6/2001 | Sagues |
| 6,587,802 | B1 | 7/2003 | Schroder et al. |
| 7,043,961 | B2 * | 5/2006 | Pandey et al. .................. 73/1.81 |
| 7,703,355 | B2 | 4/2010 | Halder et al. |
| 2002/0068992 | A1 | 6/2002 | Hine et al. |
| 2006/0045666 | A1 | 3/2006 | Harris et al. |
| 2009/0018792 | A1 | 1/2009 | Kuehnrich |

FOREIGN PATENT DOCUMENTS

WO    WO 2006/089887 A2    8/2006

OTHER PUBLICATIONS

Partial International Search Report for PCT/US2009/000077, mailed on Sep. 21, 2009.

* cited by examiner

*Primary Examiner* — Robert R Raevis
(74) *Attorney, Agent, or Firm* — Myers, Bigel (57) ABSTRACT

A method of calibrating positions within a materials handling system, wherein the materials handling system includes multiple stations for carrying out tasks and a carrier that is movable between the multiple stations, includes the steps of: providing calibration points at a plurality of the multiple stations; moving the carrier to at least some of the calibration points; contacting the calibration points; recording the locations of the calibration points; and determining locations of key components of the stations based on the locations of the calibration points. In some embodiments, the method includes contacting the calibration points with a calibration tool, which may include: a cylindrical body; a groove in the cylindrical body sized and configured to receive jaws from the carrier; and a cylindrical upper flange positioned on an upper end of the cylindrical body. In this configuration, the tool can be gripped by the carrier and employed to perform a variety of calibration functions.

14 Claims, 12 Drawing Sheets

SYSTEM AND METHOD FOR CALIBRATING AN AUTOMATED MATERIALS HANDLING SYSTEM

CROSS-REFERENCE TO RELATED APPLICATION

This application claims priority from U.S. application Ser. No. 12/349,626, filed Jan. 7, 2009, which claims priority from U.S. Provisional Patent Application No. 61/020,192, filed Jan. 10, 2008, the disclosures of which are hereby incorporated herein by reference as if set forth in their entirety.

FIELD OF THE INVENTION

The present invention is directed generally to automated materials handling systems, and more specifically is directed to the calibration of automated materials handling systems.

BACKGROUND OF THE INVENTION

Pharmacy generally began with the compounding of medicines, which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. Different exemplary approaches are shown in U.S. Pat. No. 5,337,919 to Spaulding et al. and U.S. Pat. Nos. 6,006,946; 6,036,812 and 6,176,392 to Williams et al. The Williams system conveys a bin with tablets to a counter and a vial to the counter. The counter dispenses tablets to the vial. Once the tablets have been dispensed, the system returns the bin to its original location and conveys the vial to an output device. Tablets may be counted and dispensed with any number of counting devices. Drawbacks to these systems typically include the relatively low speed at which prescriptions are filled and the absence in these systems of securing a closure (i.e., a lid) on the container after it is filled.

One additional automated system for dispensing pharmaceuticals is described in some detail in U.S. Pat. No. 6,971,541 to Williams et al. This system has the capacity to select an appropriate vial, label the vial, fill the vial with a desired quantity of a selected pharmaceutical tablet, apply a cap to the filled vial, and convey the labeled, filled, capped vial to an offloading station for retrieval.

Although this particular system can provide automated pharmaceutical dispensing, certain of the operations may be improved. In particular, it may be convenient for an owner of an automated pharmaceutical dispensing machine to be able to calibrate the machine after installation, after the machine has been moved within a pharmacy, or if one or more position-sensitive components or stations has been replaced. Calibration can be important for successful operation of the machine, as the robotic arm must be able to position itself reliably and consistently relative to the different components/stations of the machine (particularly the different dispensers for vials and tablets and multiple offloading compartments) in order for the machine to operate reliably.

SUMMARY OF THE INVENTION

As a first aspect, embodiments of the present invention are directed to a calibration tool for an automated materials handling system, wherein the materials handling system has a carrier that is configured to move between multiple stations within the system. The tool comprises: a cylindrical body; a groove in the cylindrical body sized and configured to receive jaws from the carrier; and a cylindrical flange positioned on an end of the cylindrical body. In this configuration, the tool can be gripped by the carrier and employed to perform a variety of calibration functions.

As a second aspect, embodiments of the present invention are directed to a calibration system for an automated materials handling system, the materials handling system having a carrier that is configured to move between multiple stations within the materials handling system. The calibration system comprising: a pair of gripping jaws attached to the carrier; and a tool having a groove and a cylindrical flange.

As a third aspect, embodiments of the present invention are directed to a method of calibrating positions within a materials handling system, wherein the materials handling system includes multiple stations for carrying out tasks and a carrier that is movable between the multiple stations. The method comprising the steps of: providing calibration points at a plurality of the multiple stations; moving the carrier to at least some of the calibration points; contacting the calibration points; recording the locations of the calibration points; and determining locations of key components of the stations based on the locations of the calibration points. In some embodiments, the method includes contacting the calibration points with a calibration tool, which may be configured as described above.

DETAILED DESCRIPTION OF EMBODIMENTS OF THE INVENTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Also, as used herein, the terms "downstream" and "upstream," which are often used in manufacturing environments to indicate that certain material being acted upon is farther along in the manufacturing process than other material, are intended to indicate relative positions of components along a path followed by a substantially continuous paper sheet that travels along and through the components. A component that is "downstream" from another component means that the first component is positioned farther along the paper path, and a component that is "upstream" from another component means that the first component is nearer the origin of the paper path. It should be noted that, relative to an absolute x-y-z coordinate axis system, these directions shift as the paper is conveyed between different operations. When they occur, these shifts in absolute direction are noted hereinbelow, and the downstream direction is redefined with reference to structures illustrated in the drawings.

Well-known functions or constructions may not be described in detail for brevity and/or clarity.

Figure 1:
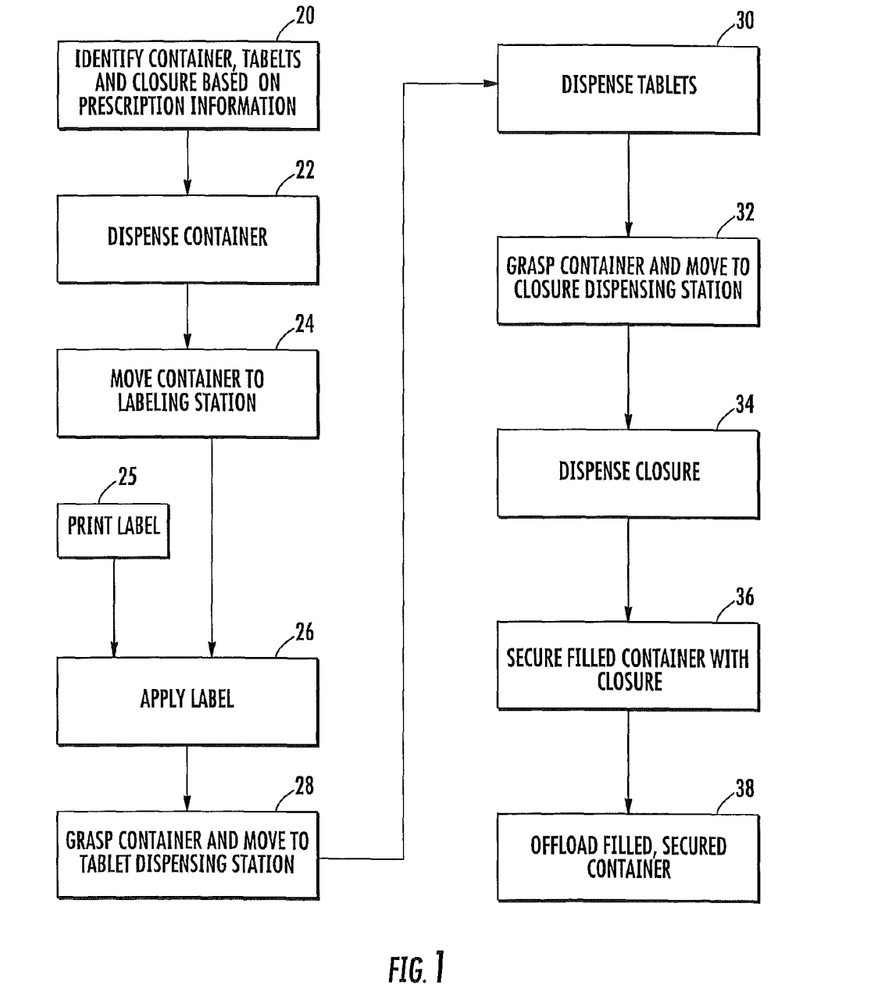
FIG. 1 is a flow chart depicting operations that can be carried out by an automated pharmacy machine according to embodiments of the present invention.

As described above, the illustrated embodiment of the invention relates generally to a system and process for dispensing pharmaceuticals. An exemplary process is described generally with reference to FIG. 1. The process begins with the identification of the proper container, tablets or capsules and closure to be dispensed based on a patient's prescription information (Box 20). A container of the proper size is dispensed at a container dispensing station (Box 22), then moved to a labeling station (Box 24). A printing station prints a label (Box 25) that is applied at the labeling station (Box 26), after which the container is transferred to a tablet dispensing station (Box 28), from which the designated tablets are dispensed in the designated amount into the container (Box 30). The filled container is then moved to a closure dispensing station (Box 32), where a closure of the proper size has been dispensed (Box 34). The filled container is secured with a closure (Box 36), then transported to an offload station and offloaded (Box 38).

Techniques are illustrated and described with respect to an automated pharmaceutical dispensing machine, but may be employed with any automated system that includes a robotic arm, including manufacturing, distribution, sorting, dispensing, and other systems.

Overall System and Carrier Unit

Figure 2:
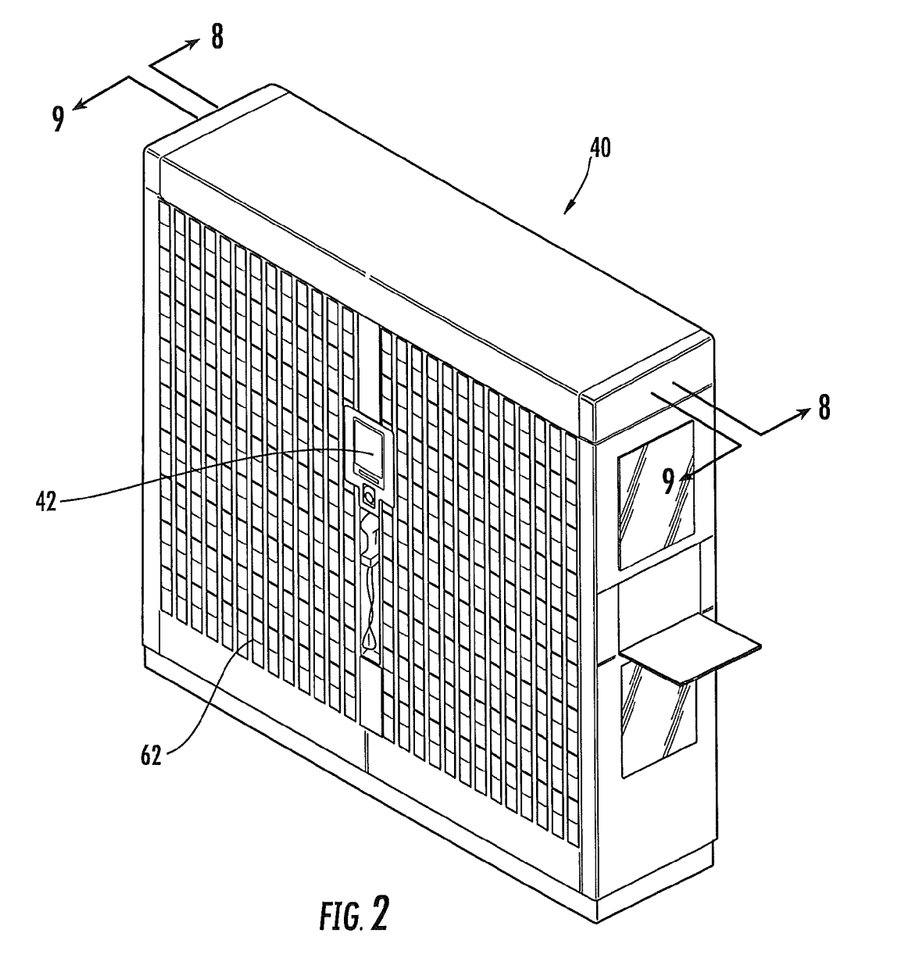
FIG. 2 is a front perspective view of an automated pharmacy machine according to embodiments of the present invention.
Figure 3:
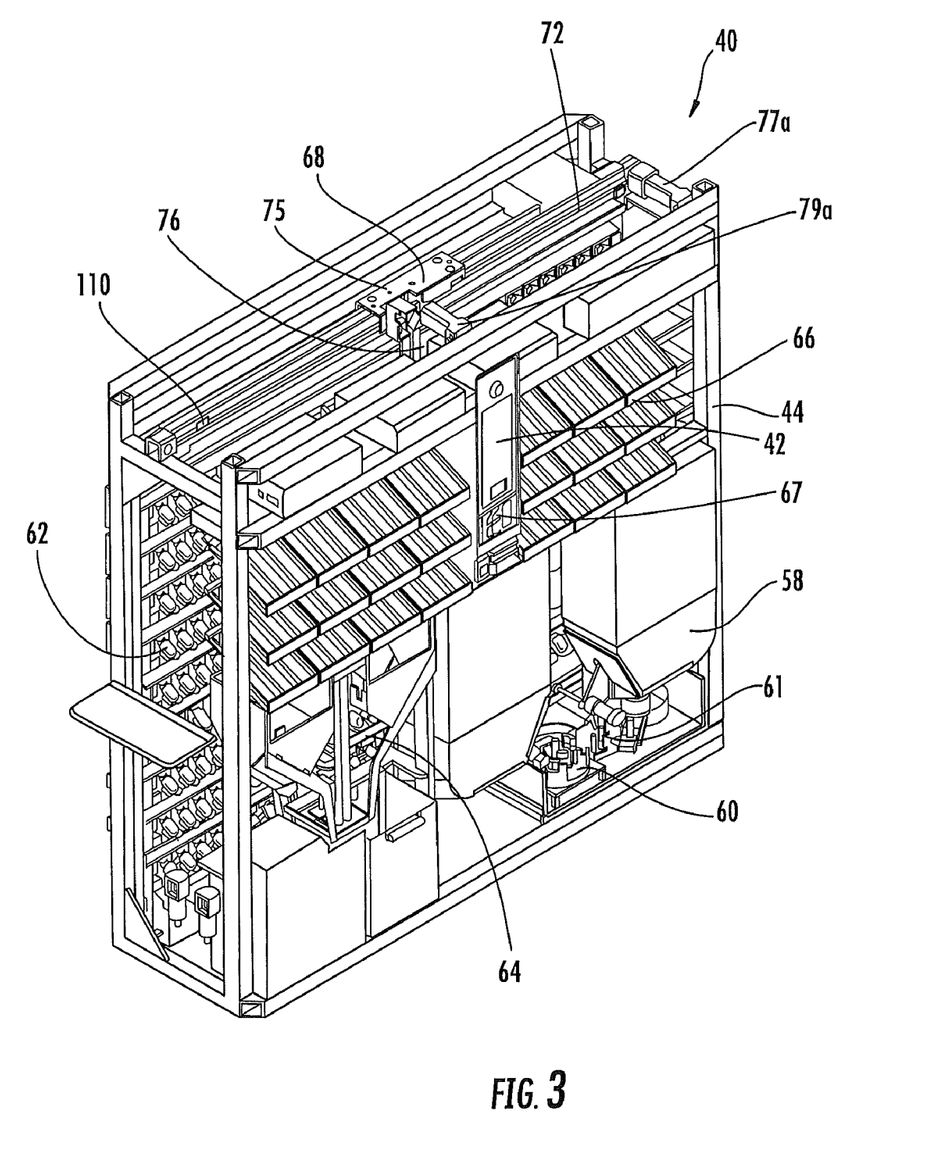
FIG. 3 is a rear perspective view of the automated pharmacy machine of FIG. 2 with the outer skin removed to permit visual access to components housed therein.

A system that can carry out this process is illustrated in FIGS. 2 and 3 and designated broadly therein at 40. The system 40 includes a support frame 44 for the mounting of its various components. The system 40 generally includes as operative stations a controller (represented herein by a graphics user interface monitor 42), a container dispensing station 58, a labeling station 60, a printing station 61, a tablet dispensing station 62, a closure station 64, an offloading station 66, and an offloading carousel 67. In the illustrated embodiment, containers, tablets and closures are moved between these stations with a single carrier unit 68; however, in some embodiments only a single carrier may be employed, or one or more additional carriers may be employed. The operation of the container dispensing station 58, the labeling station 60, the tablet dispensing station 62, the closure station 64, and the offloading station 66 are described in, for example, U.S. patent application Ser. Nos. 11/599,526; 11/599,576; 11/679,850; and 11/111,270, and U.S. patent application Ser. No. 11/927,865, the disclosure of each of which is hereby incorporated herein in its entirety.

The carrier unit 68 comprises a top rail 72 and a bottom rail (not shown), each of which is mounted to the frame 44. A vertical rail 76 is slidably mounted between the top rail 72 and bottom rail respective slide brackets (slide bracket 75, which is mounted on the top rail 72, is shown in FIG. 3). A toothed belt is attached to the slide bracket 75 and to a motor 77a that is mounted to the frame 44 for driving the vertical rail 76 to different positions along the horizontal rails. A traveler unit 78 (FIG. 4) is slidably mounted on the vertical rail 76. A toothed belt (not shown) is connected to the traveler unit 78 and a motor 79a mounted on the slide bracket 75 for driving the traveler unit 78 vertically along the vertical rail 76.

Referring again to FIG. 4, the traveler unit 78 includes a body 83 around which a gripper unit 80 revolves. The gripper unit 80 is mounted in a set of upper and lower tracks 88, 89 that extend circumferentially around the body 83. The gripper unit 80 includes an arm 82 and a pair of jaws 84. The jaws 84 include a pair of fingers 84a and a yoke 84b on which the fingers 84a are mounted. A motor 81a is mounted on the body 83 and drives the gripper unit 80 around a vertical axis A1 (defined generally by the vertical rail 76) via a gear 81 that engages teeth in a track 85 on the upper track 89.

Figure 4:
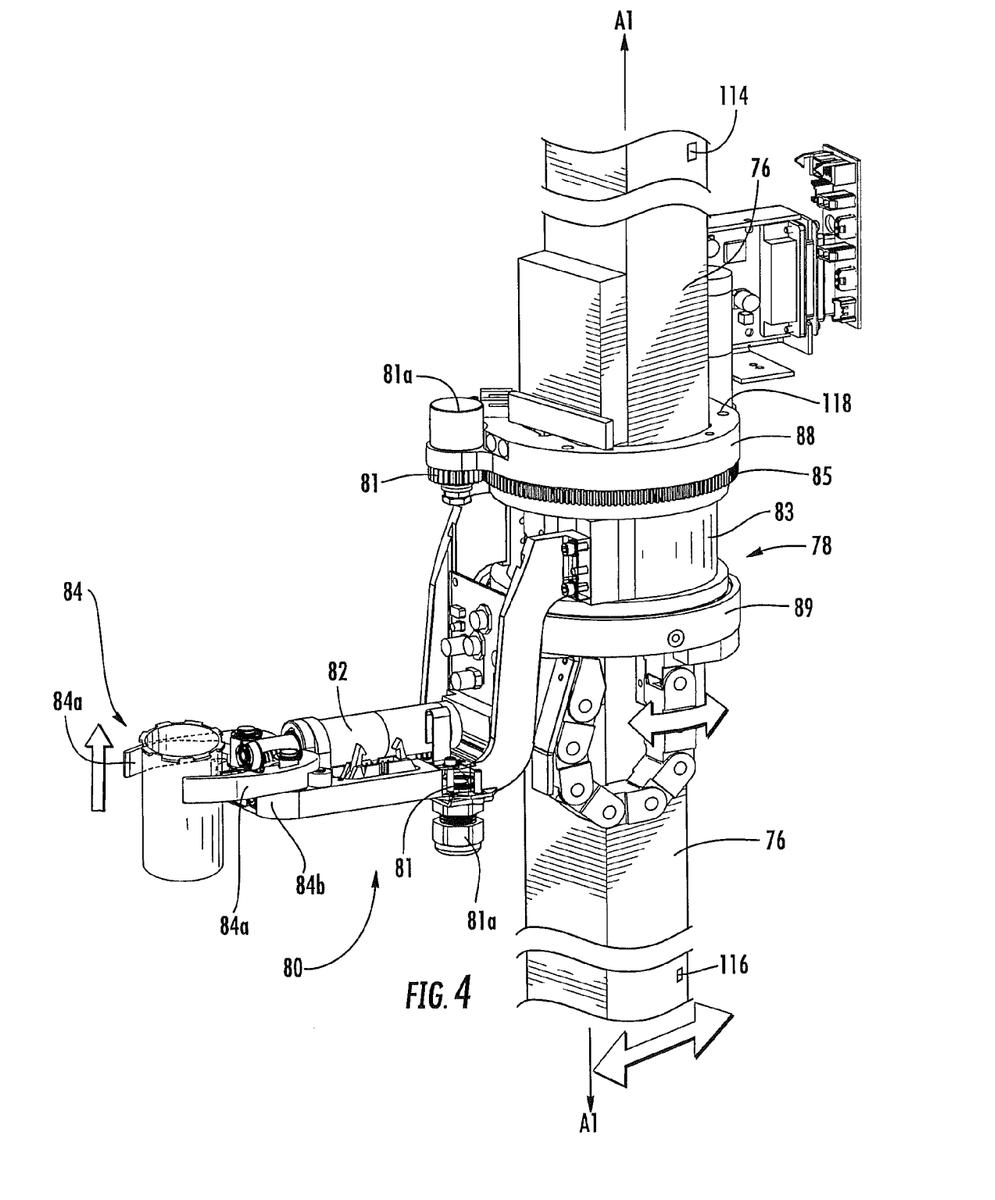
FIG. 4 is an enlarged perspective view of the gripping unit of the automated pharmacy machine of FIGS. 2 and 3.

By virtue of this configuration, the gripper unit 80 can be driven to any position along an "X-Z" plane defined by the horizontal rails 72, 74 (the X-axis) and the vertical rail 76 (the Z-axis). The gripper unit 80 can also be revolved to any angular (θ) position relative to the Z-axis. As such, the gripper unit 80 can be directed to the various stations of the system 40 to carry out operations at each. Movement of the gripper unit 80 and the jaws 84 is controlled by the controller 42, which activates the motors 77a, 79a, 81a.

Position Detection

A. Use of Servo-Controlled Motors to Detect Position

Each of the motors 77a, 79a, 81a is a servo-controlled motor. The controller 42 monitors the current drawn through the motor; because the current flowing through the windings of the motor is proportional to the torque of the motor shaft, a limit on the available current can limit the force applied by the motor or any structure coupled thereto. These features of the motor can be employed to assess the position of a stationary structure. For example, the jaws 84 of the gripper unit 80 can be instructed to move to a particular location, or can be instructed to move at a target velocity for a specified time period. If a stationary structure impedes the movement, the positioning error of the motor increases until a threshold is reached; the position of the jaws 84 can then be noted by the controller 42 as indicating the presence and position of the stationary structure.

B. Contact Points of Carrier Unit

Although the jaws 84 themselves may be employed to contact structures within the system 40 for the purpose of determining their positions, in some embodiments worm gears used to drive the fingers 84a can wear over time and, as a result, introduce inaccuracy. The yoke 84b is less prone to introduce inaccuracy; however, for some structures it is difficult or impossible to contact the structure with the yoke 84b. Accordingly, a stanchion or pin may be positioned on or near the structure that the yoke 84b can reach. As an alternative, a tool gripped by the jaws 84 and extending beyond the length of the fingers 84a may be employed.

Figure 5A:
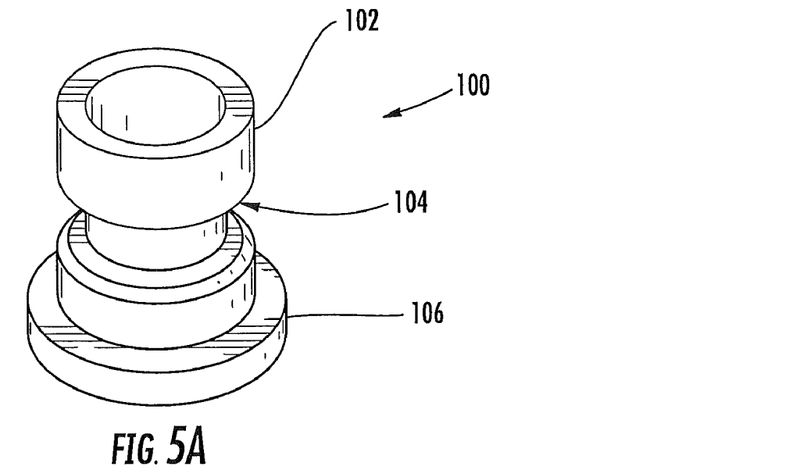
FIGS. 5A-5C are top, front and perspective views of a calibration tool useful in calibrating the automated pharmacy machine of FIGS. 2 and 3.
Figure 5B:
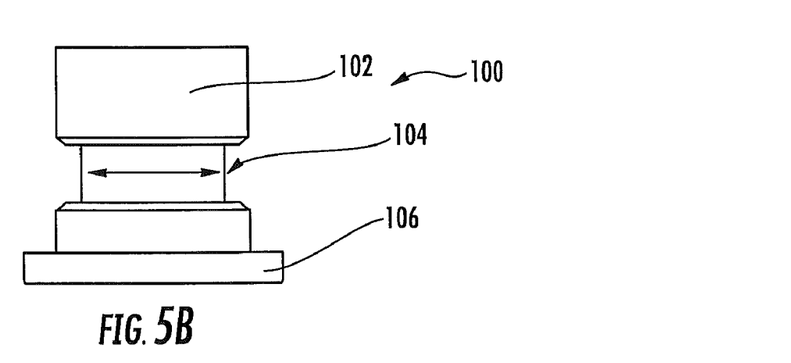
Figure 5C:
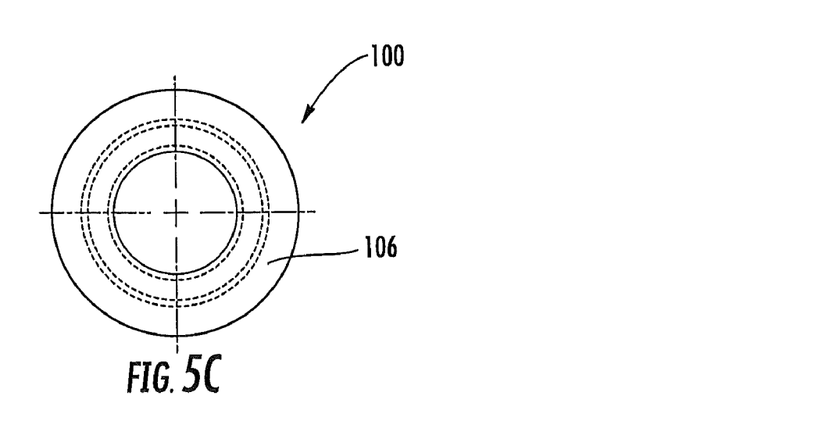

An exemplary tool for such use is illustrated in FIGS. 5A-5C and designated at 100. The tool 100 has a generally cylindrical body 102 with a circumferential groove 104, a flat bottom surface, and a lower flange 106. The fingers 84a of the jaws 84 can grip the tool 100 in the groove 104; in some embodiments, the groove 104 is sufficiently deep (between about 0.3 and 0.6 inches) that the fingers 84a can fit completely within the groove 104. The body 102 should have a radius large enough (typically between about 0.5 and 1 inch) that the bottom surface of the body 102 can be used to descend upon and (a) contact a horizontal surface or (b) lowered onto a post. The flange 106 is cylindrical and should be thick enough to support the weight of the tool 100, and its diameter should be selected so that it can fit within a machined groove or other reference point. Typically, the diameter of the flange 106 is between about 1.5 and 2.5 inches, and the thickness of the flange 106 is between about 0.1 and 1.0 inch. Also, typically the diameter of the flange 106 is at least about 0.5 inches greater than the diameter of the body 102. In some embodiments, the tool 100 may have both upper and lower flanges, which may be of the same or different diameters, or may lack a flange entirely.

In the illustrated embodiment, the tool 100 is stored on the frame 44; more specifically, the tool 100 is stored on a post 190 located on a shelf 192 below the offload station 66 (see FIG. 9); however, in other embodiments the tool 100 may be stored in any location from which it can be retrieved reliably.

C. Calibration Maneuvers

In order to locate the positions of different structures within the system 40, the gripper 80, with or without the tool 100, can be used to contact the structure of interest. In some embodiments, the position of the structure of interest is determined relative to a structure of known position. For example, in the illustrated embodiment, a homing sensor 110 is located at one end of the top rail 72, another homing sensor (not shown) is located at the opposite end of the bottom rail (also not shown), homing sensors 114, 116 are located at either end of the vertical rail 76, and a homing sensor 118 is located on the body 83 of the gripper unit 80. As an initial maneuver, the gripper unit 80 may locate one or more of the homing sensors to establish a baseline position.

1. Horizontal Surface Contact

With this technique, the bottom of the yoke 84b or the bottom surface of the tool 100 is driven into contact with a flat horizontal surface. Examples of reference point surfaces are shelves of the offloading station 66, a small vertical post, or any kind of inset or offset ledge. In order for this maneuver to be successful, the tool 100 should be able to contact the surface without bumping into any other features nearby, the feature providing the surface should not interfere with normal operation of the carrier unit 68, and the tolerance stack-up between the surface and the actual pick-up/drop-off point should be minimized.

The procedure for finding a horizontal surface is described as follows. Initially, the carrier 68 is positioned so that the yoke 84b or the tool 100 is positioned directly above or below the reference point. A force-limited move is then performed onto the reference point. The Z-axis position (i.e., the height of the surface) can then be recorded by the controller 42.

Another procedure for Horizontal Surface Contact (which employs incrementing the Z-position of the carrier 68 or tool 100) is described below in connection with Horizontal Surface Clearing.

2. Horizontal Surface Clearing

This technique can also be used to locate a surface in the Z-direction. With this technique, either the yoke 84b or the tool 100 is moved into a lip or other protrusion with an upper or lower flat horizontal section. The height of the yoke 84b or tool 100 is incrementally adjusted until the tool 100 or yoke 84b clears the contact point. This technique is typically more time-consuming than the horizontal surface contact method discussed above, but places much less stress on the feature being located. Therefore, it may be more suitable for locating plastic features that may be present on the dispensing cells in the tablet dispensing station 62 or drop-off bins in the offloading station 66.

The procedure for locating such a feature is as follows. First, the tool 100 or yoke 84b is positioned directly adjacent and level with the surface of the reference point. A θ-axis force-limited move into the reference point, and the θ and Z positions are recorded. The tool 100 or yoke 84b is withdrawn, its Z-position is modified (typically by one-half of the desired calibration precision), and the maneuver is repeated. If the last θ position exceeds the prior θ position by a value large enough to indicate clearance of the feature, the last Z position is recorded with the controller 42 as its vertical location; otherwise, modification of the Z-position is repeated until this clearance condition is reached.

Those skilled in this art will appreciate that a similar, Z-position-incrementing technique can be used for Horizontal Surface Contact, with the controller 42 detecting contact rather than clearing.

3. Curved Surface Contact

Figure 6A:
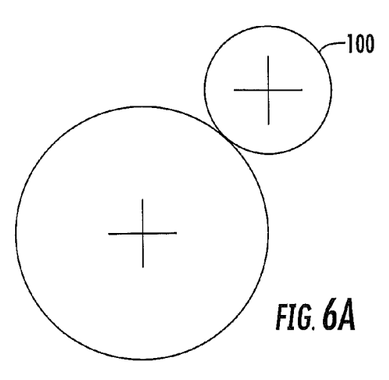
FIGS. 6A-6C are schematic diagrams illustrating the geometry used in Curved Surface Contact calibration.

This technique can be used to locate a feature in X and θ coordinates, before converting the coordinates to X and Y. A circularly curved surface of known radius is located against the edge of the tool 100 (see FIG. 6A). The lower circle in FIG. 6A represents the cross-section of the target, and the upper circle represents the cross-section of the tool 100. This alignment geometry can be achieved by contacting the tool 100 into the reference point using a force limited move. The exact contact point of the tool 100 and the target is unimportant for this calculation, allowing approximate locations of the target to be used for the initial contact. However the tool 100 should contact only the radius of the target, not flat surfaces (it should be noted that a sharp edge can be modeled as a circle of small radius). The X and Y locations of the center of the tool 100 can be calculated with known X and θ locations using simple geometry and recorded.

Figure 6B:
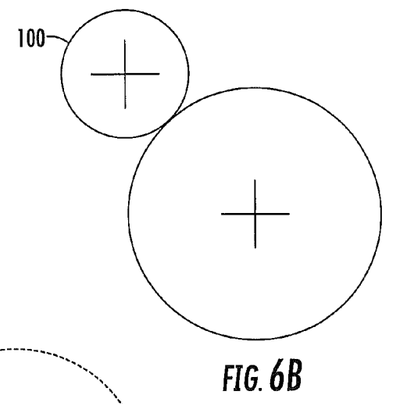

Next, the tool location is incremented in the X direction, and another force limited move is performed so that the tool 100 contacts the target at another point on the same curved surface (see FIG. 6B). The X and Y locations of the center of the tool are recorded again.

Figure 6C:
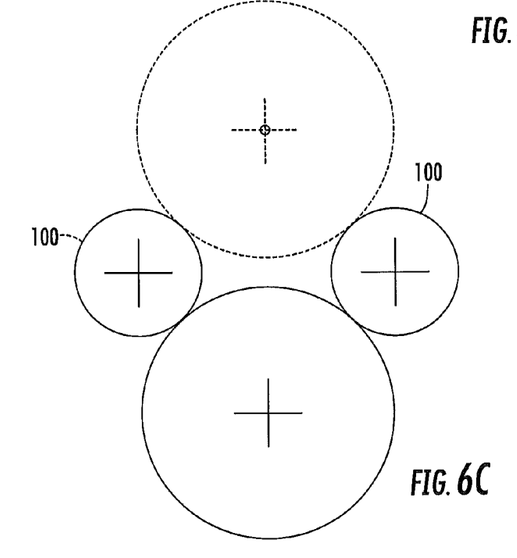

These steps yield the known geometry picture shown in FIG. 6C. The two contact points enable the definition of two circles of known radius tangent to a third circle of known radius. Geometrically, there are only two possible locations for the center of the target circle. The locations of each of these centers can be computed; based on the physical realities of the system 40, the solution that is on the "wrong" side of the tool 100 can be discarded.

4. Tool and Groove Contact

Figure 7A:
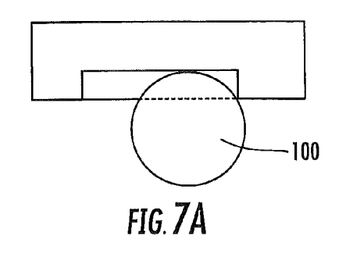
FIGS. 7A and 7B are schematic diagrams illustrating an exemplary groove for use in Tool and Groove Contact calibration.
Figure 7B:
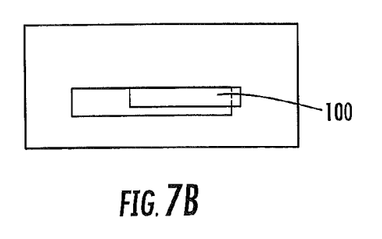

Referring now to FIGS. 7A and 7B, with this technique the tool 100 is inserted into a narrow groove having a length selected to be large enough so that the tool 100 has a distinctive clearance on both sides of it when inserted (typically, the groove length is between about 2 and 4 inches). The extreme ends of the groove can be detected when the tool 100 reaches a local absolute maximum distance away from center as it moves across the groove. The height of the groove should be chosen so that force-controlled moves can be performed into the top and/or bottom edges of the groove using the same procedure described above for Horizontal Surface Contact.

Either or both of the lateral edges of the groove may be located by the following procedure. An initial position is selected such that the tool 100 can be moved in the θ-direction toward the edge of the groove. A force-controlled move in the θ-direction is then performed, and the position is recorded as the "outside" position. The position of the tool 100 is then incremented in the X-direction by ½ of the required reference point precision, and another force-controlled move in the θ-direction is performed. If θ is equal to the last position (within some tolerance) and greater than the outside position (by some minimum amount related to the groove depth), then the edge has been found, and the X- and θ-coordinates can be recorded.

D. Illustrative Calibration Maneuvers for Pharmaceutical System

The system 40 may include a number of reference points for calibration: as examples, the labeler station 60, the closure station 64, different sections of the offloading station 66 (e.g., sorted drop-off, bulk drop-off, exception drop-off, etc.), individual bins of the tablet dispensing station 62, and the homing sensors 112, 114, 116, 118. For each subassembly, calibration points should be chosen that minimize the cumulative manufacturing tolerance between the calibration points and the actual locations where a vial is picked up, conveyed or dropped off.

At each stage, the cumulative manufacturing tolerance between the main robot homing sensors and each interface point may be assumed to be a particular value, e.g., ±0.25 inches. Additionally, the choice of any given reference point may become a high-precision interface for manufacturing.

Exemplary reference points are discussed below.

1. Homing Sensors

Referring now to FIG. 4, manufacturing tolerances in the homing sensors 112, 114, 116 (i.e., the X- and Z-axis sensors) change the relationship between those sensors and the target reference points in an exactly linear way. As such, their required placement precision is relatively low, as any manufacturing variability for these parts simply adds to the maximum total distance between the sensor and the reference point, which is accounted for in each calibration procedure by the choice of initial position.

In contrast, the θ-axis is non-linearly related to the Y position of any reference point. Both the curved surface contact and the tool-in-groove interfaces result in a reference geometry that is defined relative to a centered θ-axis. Thus, either the homing sensor 118 can be well-aligned with true centerline (i.e., with the X-axis), via precision machining or the like, or a target can be provided that is near true centerline. In this latter technique, a pair of moves can be performed into a single location (in this instance, that location is located at the tool shelf 192). The θ-position after both moves can be recorded, and the average between the two used as a reference for 90 degrees.

2. Z-Axis Twist

In addition to a single point being calibration for "true center" for theta, the system can calibrate the amount of Z-axis twist present in the system. Without this calibration, if the gripper unit 80 rotates to the same angular position at the top and bottom of the vertical rail 76, it may not be extending at the same angle because the vertical rail 76 has some twist. Thus, in addition to calibrating the single θ point described above, the positions of each cell manifold from top to bottom can be calibrated to determine how much twist is present. After this calibration, a θ measurement will orient itself correctly depending on the height of the carriage.

To calibrate for Z-axis twist, a force limited move is performed pushing the tool 100 against a cell manifold 152 at some location on the manifold. Then the gripper unit 80 is turned around to be reverse-facing and moved to the same location again. (Note: this is very similar to the homing sensor calibration described above.) The θ location after each of the moves is recorded. Using these two values a θ offset at this height within the system is determined. This is repeated for each of the manifolds 152. These data provide an array of θ offsets for the total length of travel for the length of the vertical rail 76. This procedure can effectively model the twist of the z-axis within the system.

Later, when a move is performed to any location in the system, the array of θ offsets is used to determine how much θ offset to apply to the calculation. Thus, every time a move is performed during normal operation, the height at which the move is performed can be used to index into the array and extrapolate the θ offset at that particular height.

3. Labeling Station

To determine the position of the labeling station 60 (where the carrier unit 68 picks up an empty, uncapped, labeled vial), a small-diameter post 200 of approximately ¼ inch OD can be included on the labeler base plate 61 (see FIGS. 9 and 10), positioned such that (a) it does not interfere with normal labeling and pick-up operation and (b) it can be felt with the yoke 84b in Z-, X-, and θ-positions. The carrier unit 68 conveys the yoke 84b to the post 200, where horizontal surface clearing and curved surface contact maneuvers are performed.

The pick-up positioning accuracy in the Z-direction for the labeling station 60 is additive with the required vertical positioning accuracy at the bins of the tablet dispensing station 62. The pick-up positioning accuracy in the X- and Y-directions for the labeling station 60 is based on the ability of the gripper unit 80 to pick up a vial at this location; it is not additive to targeting accuracy at the closure station 64 since the gripper unit 80 automatically centers a vial between the jaws 84 when it picks up the vial.

4. Dispensing Bin Arrays

Individual bins of the tablet dispensing station 62 are mated vertically with a vial for dispensing by making positive contact under a force-limited upward move. This positive contact is intended to ensure that no pills will ever be lost through the gap between the bin nozzle and the vial. Horizontally, a typical bin nozzle output diameter is 1.000 inches across, and the narrowest common vial diameter is 1.125 inches. That yields a horizontal mating tolerance of about +/−0.062 inches. Vertically, the vial should be no more than 1 mm (0.032) away from the nozzle.

Figure 8:
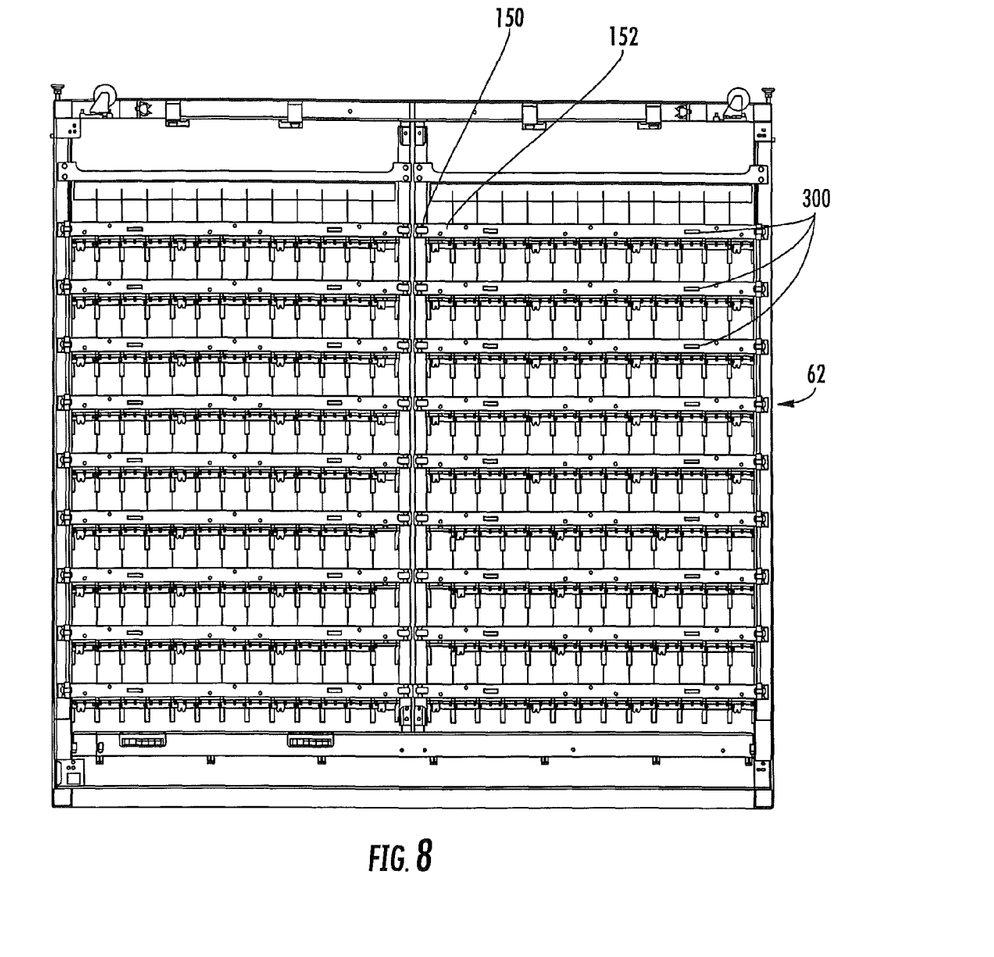
FIG. 8 is a front section view of the automated pharmacy machine of FIGS. 2 and 3 taken along lines 8-8 of FIG. 2.
Figure 11:
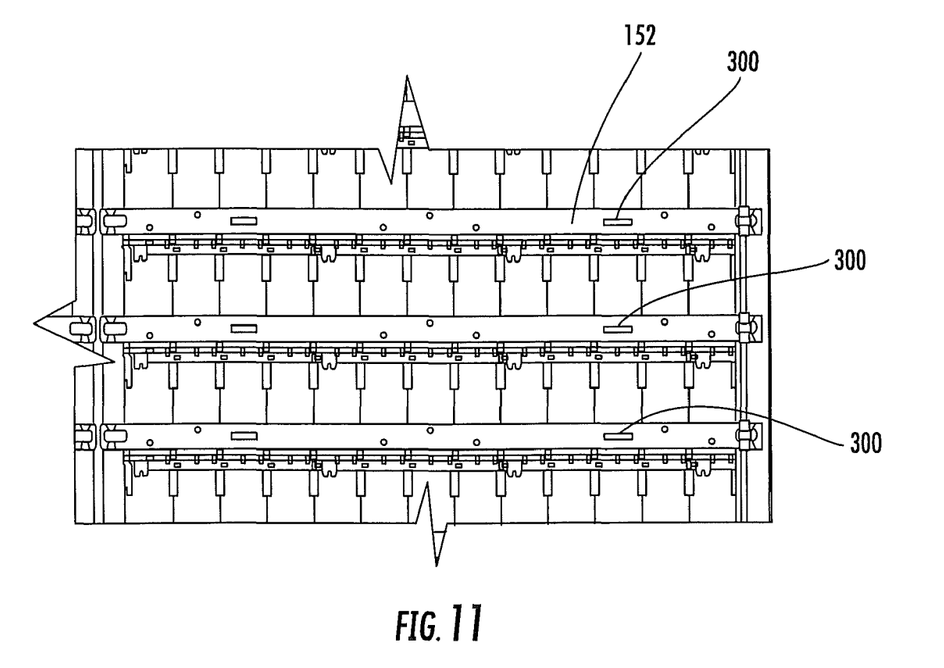
FIG. 11 is an enlarged view taken from FIG. 8 of the manifold that provides air to the bins of the dispensing station of the automated pharmacy machine of FIGS. 2 and 3 showing grooves used to calibrate the positions of the bins.

To calibrate for a proper horizontal (i.e., X- and θ-direction) interface with individual bins, in some embodiments, a series of grooves 300 may be cut into the bin manifold that are spaced at a known distance from the individual bins (see FIGS. 8 and 11). The grooves can be located with a tool-in-groove maneuver as described above. Alternatively, a structure such as a bin nozzle mating flange can be located with a curved surface contact maneuver; if this maneuver is employed, it may performed on all bins, or only on a limited number of bins necessary to develop reliable position data.

5. Closure Station

Figure 9:
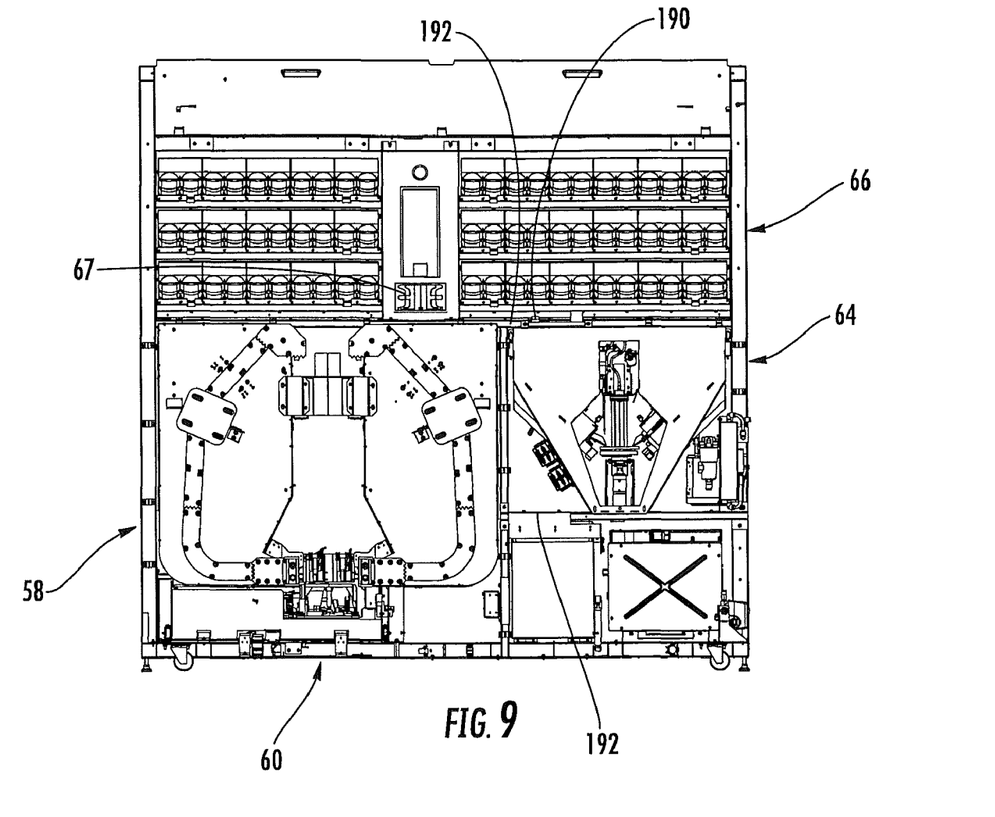
FIG. 9 is a rear section view of the automated pharmacy machine of FIGS. 2 and 3 taken along lines 9-9 of FIG. 2.
Figure 10:
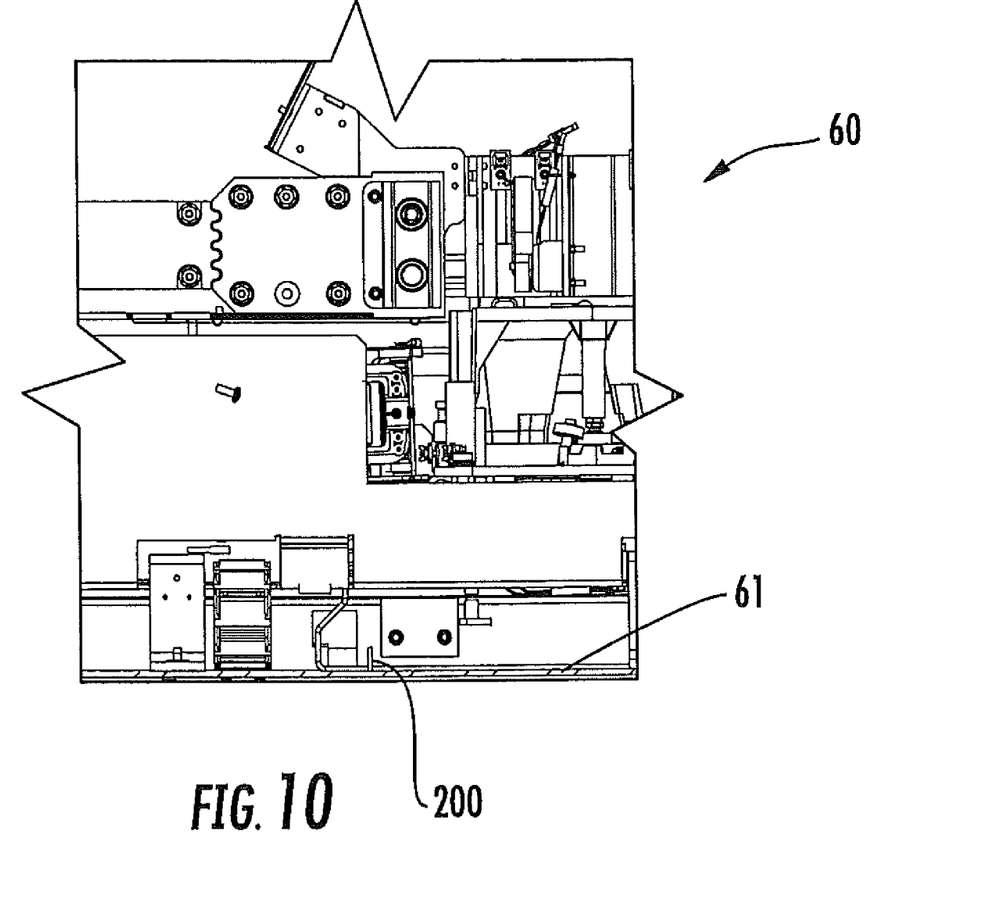
FIG. 10 is an enlarged view taken from FIG. 9 of the base plate and post of the labeler station of the automated pharmacy machine of FIGS. 2 and 3.
Figure 12:
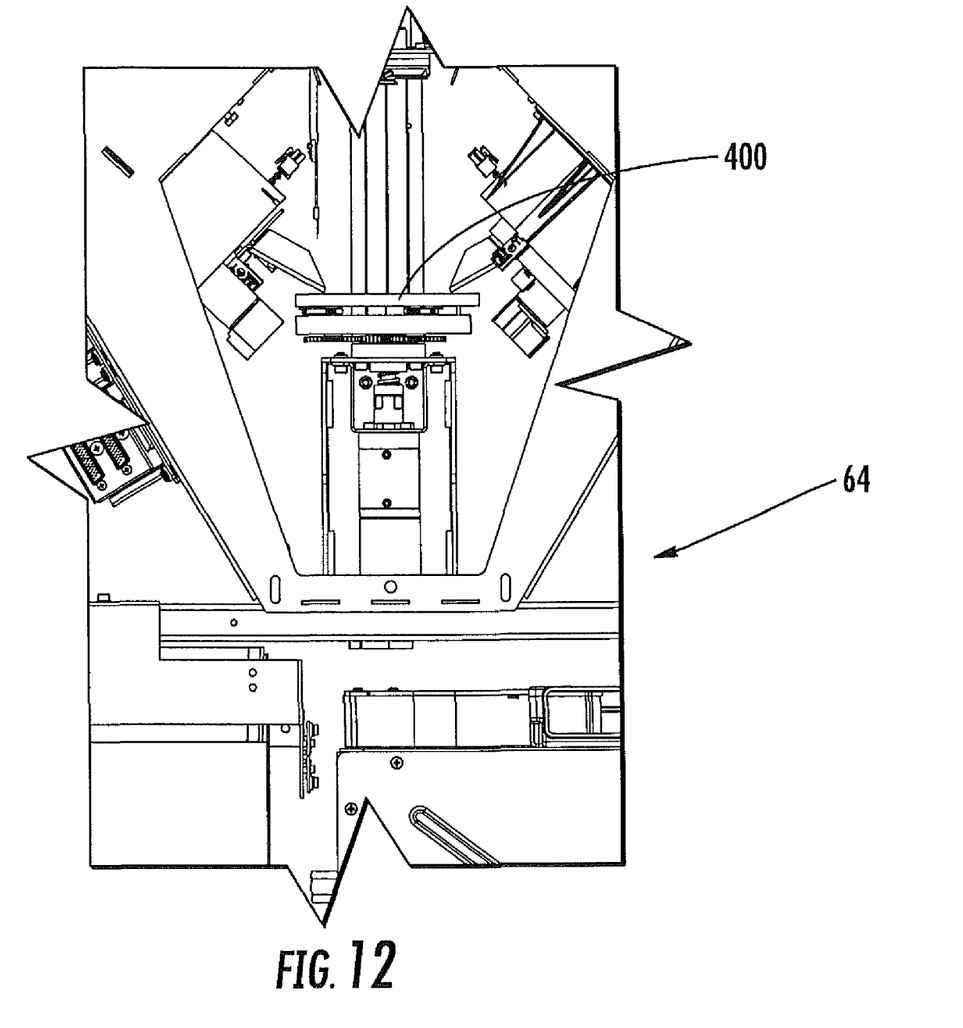
FIG. 12 is an enlarged view taken from FIG. 9 of the stage of the capping station of the automated pharmacy machine of FIGS. 2 and 3.

The location of the closure station 64 needs to be known because a filled, labeled vial is placed therein for the application of a cap or other closure. Turning to FIGS. 9 and 12, the carrier unit 68 can locate the upper surface of the stage 400 of the closure station 64 with a Horizontal Surface Contact maneuver using the tool 100 (in some embodiments, Horizontal Surface Clearing may be employed). In some embodiments, the closure station 64 need not be located in the X- and θ-directions because the drop-off and pick-up tolerances for the closure station 64 may be very large for successful docking. If this is not the case, the tool 100 can be used to find a peripheral edge of the stage 400. Curved Tool Contact can then be employed to find the center of the stage 400.

6. Off-Load Station

Figure 13:
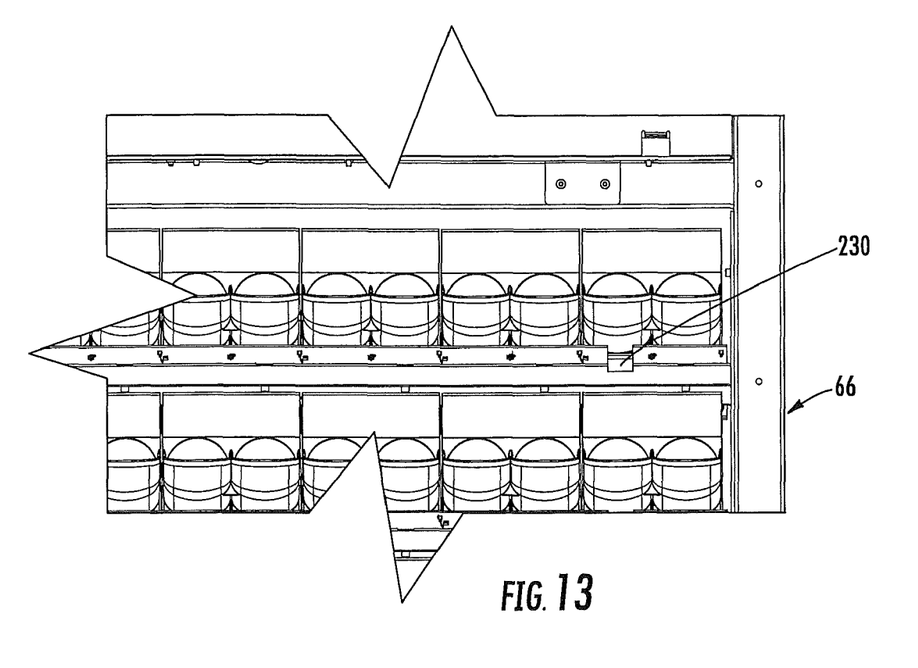
FIG. 13 is an enlarged view taken from FIG. 9 of the offload station of the automated pharmacy machine of FIGS. 2 and 3 showing a gap in the frame used to calibrate the positions of the offload chutes.

A typical off-load station, such as the station 66, may have multiple structures for potential calibration. In the illustrated embodiment, the overflow area is rather large (a drawer approximately 6 inches by 12 inches) and as such may not require calibration. The exception drop-off area consists of three shelves about 6 inches in width and may require only Z-direction calibration (e.g., finding the top surface of each shelf with a horizontal surface contact maneuver). The sorted drop-off area has multiple rows of sloped bins, the inlets to which can be located with a tool-in-groove maneuver in cut-away areas 230 in the frame (see FIGS. 9 and 13) or by Horizontal Surface Contact and Curved Tool Contact maneuvers with the lips of individual drop-off bins. Horizontal Surface Contact and Curved Surface Contact can be employed to locate the exception carousel 67 of the offload station 66.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. The invention is defined by the following claims, with equivalents of the claims to be included therein.

That which is claimed is:

1. A calibration system for an automated materials handling system, the materials handling system having a carrier that is configured to move between multiple stations within the materials handling system, the calibration system comprising:
    a pair of gripping jaws attached to the carrier; and
    a tool having a groove and a cylindrical flange, the tool being gripped by the gripping jaws in the groove.

2. The calibration system defined in claim 1, wherein the flange comprises a flat upper surface and the tool includes a flat lower surface.

3. The calibration system defined in claim 1, wherein the carrier is mounted on a set of vertical and horizontal rails for movement in vertical and horizontal planes.

4. The calibration system defined in claim 3, wherein the carrier includes a traveler that is mounted on the vertical rail and an arm, the arm being revolvable about the vertical rail.

5. The tool defined in claim 1, wherein the flange has a diameter that is at least 0.5 inches greater than a diameter of a body of the tool.

6. The tool defined in claim 1, wherein the flange has a diameter of between about 1.5 and 2.5 inches.

7. The tool defined in claim 1, wherein the flange has a thickness of between about 0.1 and 1.0 inches.

8. The tool defined in claim 1, wherein the tool has a body has a flat lower surface.

9. A calibration system for an automated materials handling system, the materials handling system having a carrier that is configured to move between multiple stations within the materials handling system, the calibration system comprising:
    a pair of gripping jaws attached to the carrier; and
    a tool having a groove and a cylindrical flange, the tool being gripped by the gripping jaws in the groove;
    wherein the materials handling system includes a frame, and wherein a storage location for the tool is positioned on the frame.

10. The calibration system defined in claim 9, wherein the carrier is mounted on a set of vertical and horizontal rails for movement in vertical and horizontal planes.

11. The calibration system defined in claim 10, wherein the carrier includes a traveler that is mounted on the vertical rail and an arm, the arm being revolvable about the vertical rail.

12. A calibration system for an automated pharmaceutical dispensing machine, the automated pharmaceutical dispensing machine having a carrier that is configured to move between multiple stations within the machine, the calibration system comprising:
    a pair of gripping jaws attached to the carrier; and
    a tool having a groove and a cylindrical flange, the tool being gripped by the gripping jaws in the groove.

13. The calibration system defined in claim 12, wherein the automated pharmaceutical dispensing machine comprises a tablet dispensing station and at least one of the following: a vial dispensing station; a labeling station; a capping station; and an offload station.

14. The calibration station defined in claim 13, wherein the tablet dispensing station comprises a plurality of tablet dispensing bins.

* * * * *